United States Patent [19]

Casey

[11] Patent Number: 5,072,243

[45] Date of Patent: Dec. 10, 1991

[54] ELECTROSTATIC PURGE FOR AN ION PROJECTION DEVICE

[75] Inventor: Brendan C. Casey, Webster, N.Y.

[73] Assignee: Xerox Corporation, Stamford, Conn.

[21] Appl. No.: 566,933

[22] Filed: Aug. 13, 1990

[51] Int. Cl.[5] .......... G01D 15/06

[52] U.S. Cl. .......... 346/159; 346/1.1; 355/296; 134/1; 15/1.51

[58] Field of Search .......... 134/1; 346/159, 1.1; 15/1.51; 355/296

[56] References Cited

U.S. PATENT DOCUMENTS

| | | | |
|---|---|---|---|
| 2,825,078 | 3/1958 | Bugler et al. | 15/1.5 |
| 3,668,008 | 6/1972 | Severynse | 134/1 |
| 3,743,540 | 7/1973 | Hudson | 15/1.51 X |
| 4,121,947 | 10/1978 | Hemphill | 134/1 |
| 4,165,171 | 8/1979 | Lemmen | 355/15 |
| 4,395,746 | 7/1983 | Tanaka et al. | 361/143 |
| 4,463,363 | 7/1984 | Gundlach et al. | 346/159 |
| 4,478,510 | 10/1984 | Fujii et al. | 355/296 |
| 4,621,274 | 11/1986 | Yuasa | 346/1.1 X |

*Primary Examiner*—Benjamin R. Fuller

*Assistant Examiner*—Randy W. Gibson

*Attorney, Agent, or Firm*—Paul J. Maginot

[57] ABSTRACT

A method and device which removes particulates from a gap in an ion projection device, when the device is not enabled for printing, with the gap being defined by a charge receiver and a printer head. The particulates within the gap are subjected to a variety of mechanical forces due to the application of a varying field from a plurality of modulation electrodes and a flow of transport fluid from a pressurized transport fluid source. The forces applied to the particulates cause them to be removed from the above gap thereby enhancing the integrity of the imaging charge which is placed upon the moving charge receiver sheet.

11 Claims, 5 Drawing Sheets

ELECTROSTATIC PURGE FOR AN ION PROJECTION DEVICE

This invention relates generally to ionographic systems for creating images, and more particularly concerns a method and apparatus to enhance the integrity of the imaging charge which is placed upon the moving charge receiver sheet.

An ion projection device, of the type utilized herein, is disclosed in U.S. Pat. No. 4,463,363 issued on July 31, 1984 in the names of Robert W. Gundlach and Richard F. Bergen, entitled "Fluid Assisted Ion Projection Printing." In that device, an imaging charge is placed upon a moving charge receiver sheet, such as paper, by means of a linear array of closely spaced minute air "nozzles". The charge, comprising ions of a single polarity (preferably positive), is generated in an ionization chamber and is then transported to and through the "nozzles" where it is electrically controlled, within each "nozzle" structure, by an electrical potential applied to modulating electrodes therein. Selective control of the modulating electrodes in the array will correspondingly selectively enable or inhibit particular spots of charge to be deposited on the charge receiver sheet for subsequent development.

Positioned near the modulation electrodes is a gap which is defined by the printer head and charge receiver of the device. Paper fibers and other particulates have been known to contaminate this gap, for example, during the installation of a print cartridge wherein such fibers and particulates are introduced into the gap from both the ambient air and the print cartridge. The presence of these fibers and particulates in the aforementioned gap have been shown to negatively affect the integrity of the imaging charge which is placed upon the moving charge receiver sheet. More specifically, these fibers and particulates tend to cause spurious spots of charge to be deposited on the charge receiver sheet (commonly in the form of a line) which are then subsequently developed and result in spurious spots of transfer power being permanently affixed to the output copy sheet.

The following disclosures may be relevant to various aspects of the present invention:

U.S. Pat. No. 2,825,078
Patentee: Bugler et al.
Issued: Mar. 4, 1958.

U.S. Pat. No. 4,395,746
Patentee: Tanaka et al.
Issued: July 26, 1983

The relevant portions of the foregoing disclosures may be briefly summarized as follows:

U.S. Pat. No. 2,825,078 describes an apparatus which electrostatically removes dust and dielectric particles from articles of manufacture. The apparatus includes a pair of electrostatic electrodes and the articles are advanced between the electrodes. A potential is applied to the electrodes to create an electrostatic field therebetween, which pulls the dielectric particles from the articles to one of the electrodes, and a stream of air is directed across the latter electrode to remove the particles therefrom.

U.S. Pat. No. 4,395,746 discloses a device for magnetically transporting finely divided magnetic particles accumulated or deposited at a space. First, a DC magnetic field is exerted to the finely divided magnetic particles so as to magnetize and bring them into an easy-to-be-handled state, and secondly, revolving alternating fields are exerted to the magnetized, finely divided magnetic particles, thereby magnetically transporting them.

In accordance with one aspect of the present invention, there is provided a method of removing particulates from a gap in an ion projection device, when the device is not enabled for printing, with the gap being defined by a charge receiver and a printer head having a plurality of modulation electrodes, an inlet channel, an outlet channel, an ion generator, a source of fluid in communication with the inlet channel to move fluid through the outlet channel. The method comprises the steps of moving fluid through the outlet channel, setting the output pixel state of the modulation electrodes to white, and setting the output pixel state of the modulation electrodes to black. The above setting steps are performed sequentially and alternately for a number of iterations and the fluid moving step is performed concurrently with the setting steps.

Pursuant to another aspect of the present invention, there is provided an ion printing device which comprises a charge receiver and means, positioned substantially adjacent the charge receiver, for projecting a flow of ions thereon. Means are provided for performing, when the device is not enabled for printing, at least one iteration of sequentially and alternately inhibiting the flow of ions from the ion projecting means, and enabling the flow of ions from the ion projecting means.

Other features of the present invention will become apparent as the following description proceeds and upon reference to the drawings, in which.

Figure 4:
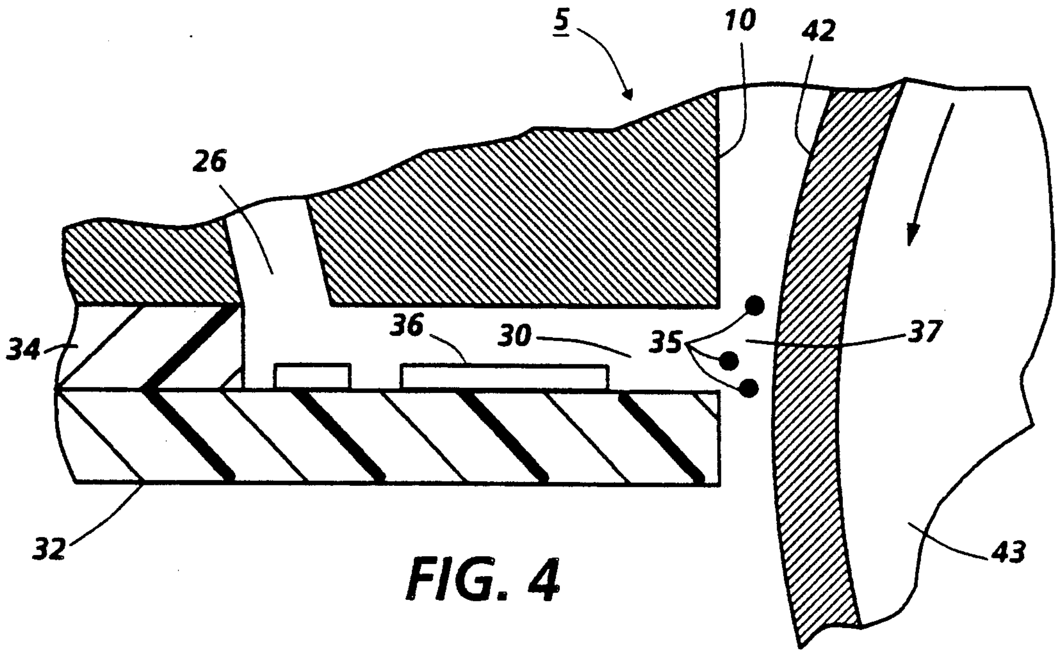
FIG. 4 is an enlarged fragmentary sectional view of a gap in the ion projection device of FIG. 1, with the gap being defined by the charge receiver and the printer head, showing a number of particles therein prior to performing the method of the present invention.
Figure 5:
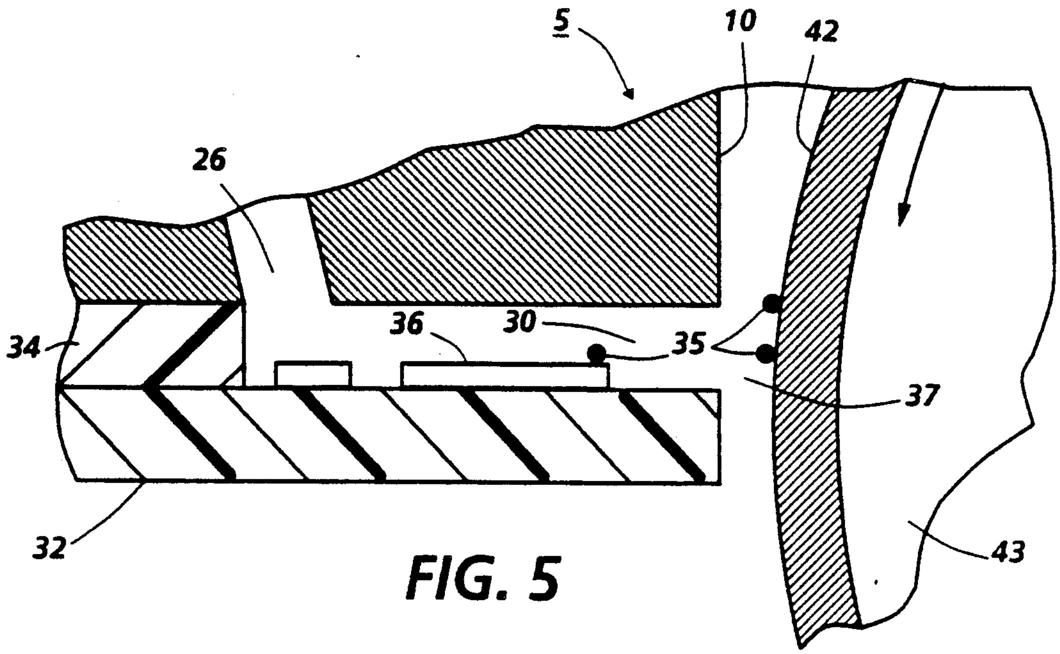
Figure 6:
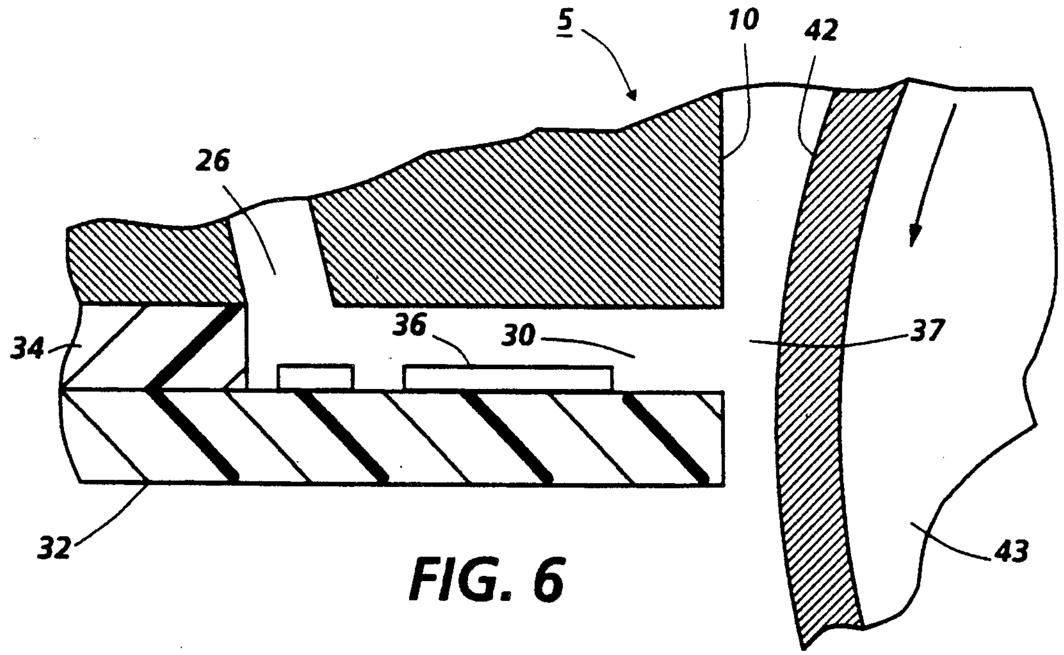

FIG. 5 is an enlarged fragmentary sectional view of the gap in the ion projection device of FIG. 4 showing the particles within the gap affixed to either the modulation electrodes or the charge receiver during the performance of the method of the present invention; and FIG. 6 is an enlarged fragmentary sectional view of the gap in the ion projection device of FIG. 4 showing the gap being free of particulates after the performance of the method of the present invention.

While the present invention will be described in connection with a preferred embodiment and method of use thereof, it will be understood that it is not intended to limit the invention to that embodiment and method of use. On the contrary, it is intended to cover all alternatives, modifications, and equivalents as may be included within the spirit and scope of the invention as defined by the appended claims.

Figure 1:
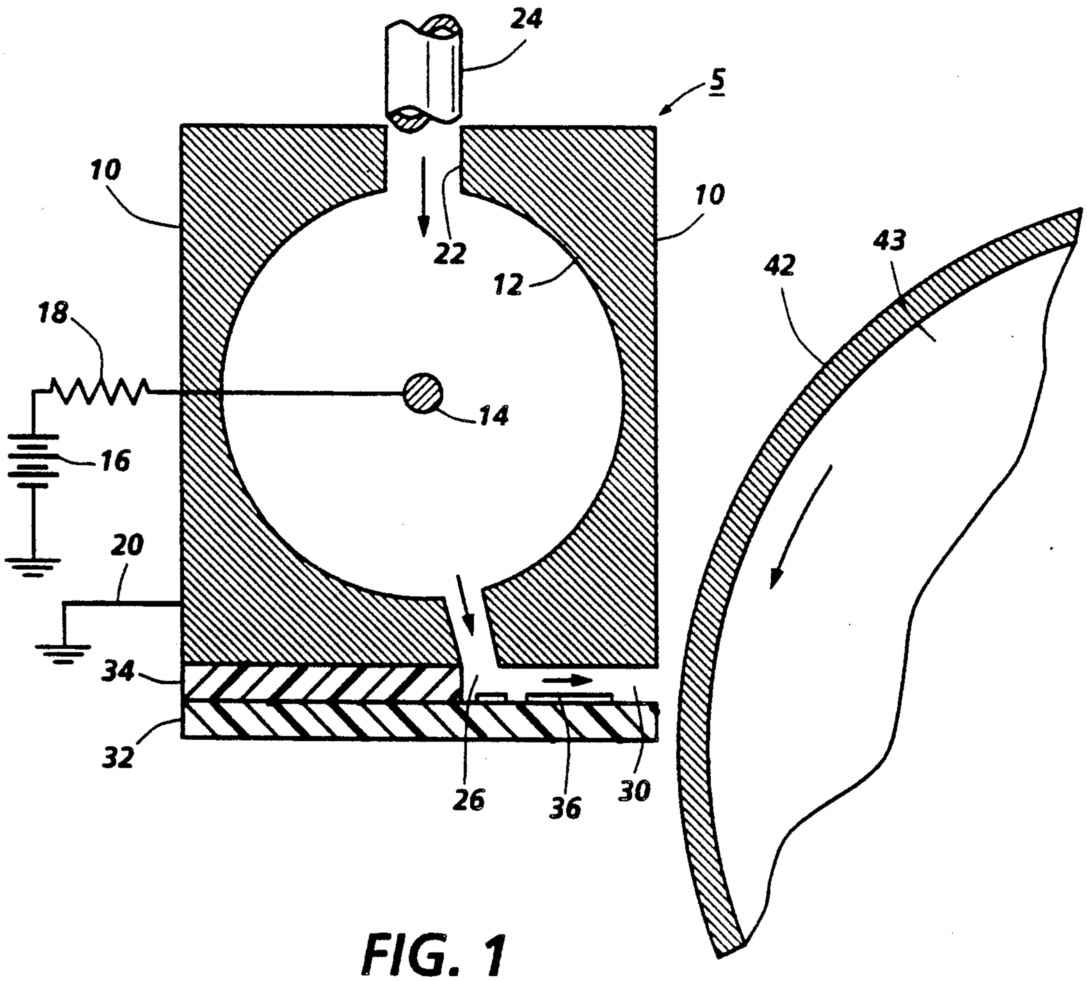
FIG. 1 is a schematic sectional elevational view depicting an ion projection device of the present invention.

Referring now to FIG. 1, there is illustrated a printer head 5 which includes an ion generating housing 10. Housing 10 includes an electrically conductive, elongated chamber 12 and a corona discharge wire 14, extending along the length of the chamber. A high potential source 16, on the order of several thousand volts dc, is connected to the wire 14 through a suitable load resistor 18, and a reference potential source 20 (which is preferably ground—i.e. approximately zero volts) is connected to the wall of the chamber 12. Upon application of the high potential to corona discharge wire 14, a corona discharge surrounds the wire, creating a source of ions of a given polarity (preferably positive), which are attracted to the grounded chamber wall and fill the chamber with a space charge.

An inlet channel 22 extends along the chamber substantially parallel to wire 14 to deliver pressurized transport fluid (preferably air) into the chamber 12 from a suitable source, schematically illustrated by a tube 24. An outlet channel 26, from the chamber 12, also extends substantially parallel to wire 14, at a location opposed to inlet channel 22, for conducting the ion-laden transport fluid to the exterior of housing 10. The outlet channel 26 comprises two portions, a first portion directed substantially radially outwardly from the chamber and a second portion 30 angularly disposed to the first portion. The second portion 30 is formed by the unsupported extension of a marking head 32 spaced from and secured to the housing by insulating shim 34.

The ion-laden transport fluid is selectively allowed to pass through outlet channel 26 and then over an array of ion pixel or modulation electrodes 36, each extending in the direction of the fluid flow, and integrally formed on marking head 32.

The ions which are allowed to pass completely through and out of printer head 5, and towards a charge receiver 42 positioned on a drum 43 collect on the surface of the charge receiver in an image configuration. The ion-laden transport fluid stream can be rendered intelligible by selectively controlling the potential of the modulation electrodes by any suitable means.

As described in U.S. Pat. No. 4,463,363, the relevant portions thereof being incorporated herein by reference, once the ions in the transport fluid stream come under the influence of modulation electrodes 36, they may be viewed as individual "beams", which may be allowed to pass to a charge receiver 42 or to be suppressed within the outlet channel. "Writing" of a single spot or pixel in a raster line is accomplished when a modulation electrode is selectively connected to a potential source at substantially the same potential as that on the opposing wall of outlet channel 26. With both walls of the channel being at about the same electrical potential, there will be substantially no electrical field extending thereacross. Thus, ions passing therethrough will be unaffected and will exit the housing to be deposited upon the charge receiver.

It should be noted that the ions which are deposited upon charge receiver 42 will ultimately cause an amount of transfer powder to be permanently affixed at a corresponding location on an output copy sheet thereby creating a black spot on the copy sheet (assuming black transfer powder is used). As a result, electrically connecting all of the modulation electrodes in the raster line to a voltage potential source that is substantially the same relative to the voltage potential of the interior wall of outlet channel 26 opposite modulation electrodes 36 will enable the flow of ions to exit the printer head at all points along the raster line and therefore is referred to as setting the output pixel state of the modulation electrodes to black.

Conversely, when a suitable potential is applied to the modulation electrode, a field will extend across outlet channel 26 to the opposite, electrically grounded, wall. If the electrical potential imposed on the modulation electrode is of the same sign as the ions, the ion "beam" will be repelled from the modulation electrode to the opposite wall where the ions may recombine into uncharged, or neutral, air molecules. If the electrical potential imposed on the modulation electrode is of the opposite sign as the ions, the ion "beam" will be attracted to the modulation electrode where they may recombine into uncharged or neutral, air molecules. Therefore, that "beam" of transport fluid, exiting from the housing in the vicinity of that modulation electrode, will carry substantially no "writing" ions.

Note that if no "writing" ions are deposited upon charge receiver 42 at a certain location, this absence of charge upon the charge receiver will subsequently not enable transfer powder to be permanently affixed at the corresponding location on the output copy sheet thereby leaving a white spot on the copy sheet (assuming a white copy sheet is used). Thus, electrically connecting all of the modulation electrodes in the raster line to a voltage potential source that is substantially different relative to the voltage potential of the interior wall of the outlet channel opposite the modulation electrodes will inhibit the entire the flow of ions exiting the printer head at all points along the raster line and hence is referred to as setting the output pixel state of the modulation electrodes to white.

An imagewise pattern of information may be formed by selectively controlling each of the modulation electrodes in the array so that the ion beams associated therewith are either enabled or are inhibited from exiting the housing in accordance with the pattern and intensity of light and dark spots of the image to be reproduced. It should be understood that the image to be recorded on the charge receiver is generally a digital image and that each light and dark spot is generally represented by a string of one or more similar binary values.

Figure 2:
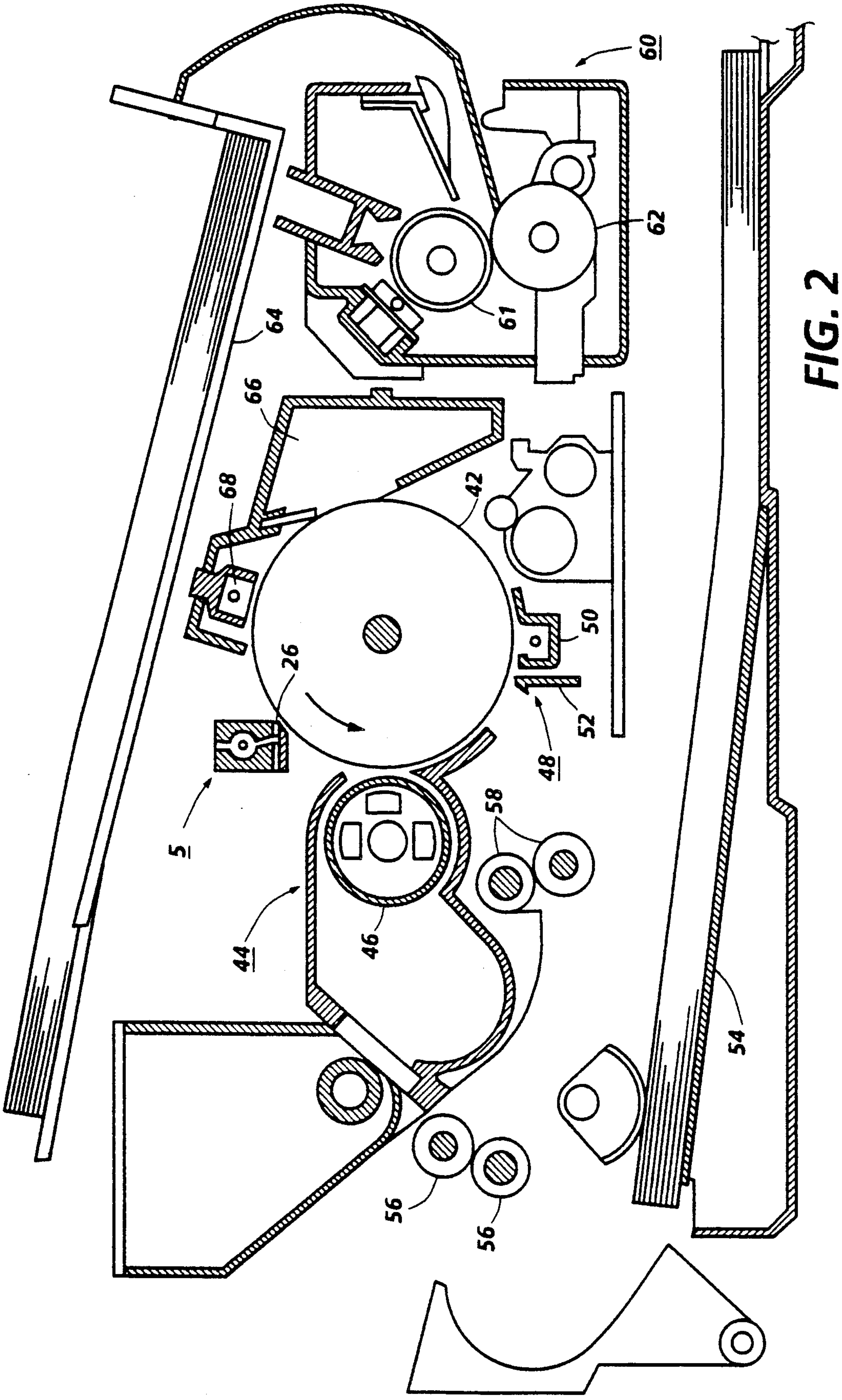
FIG. 2 is a schematic elevational view, partially in section, depicting an electrographic printing machine incorporating the ion projection device of FIG. 1.

With reference to FIG. 2, there is disclosed in general a printing apparatus in accordance with the present invention. Initially, charge receiver 42, a substrate supporting any suitable electrostatic material, is charged to an appropriate background voltage (preferably—1500 volts). A point on charge receiver 42 is rotated in a direction of the arrow past the outlet channel 26 of printer head 5. The charge pattern corresponding to the image to be reproduced is projected onto the surface of charge receiver 42 providing a latent image. Upon further rotation of the point on charge receiver to a developer means (generally shown at 44), suitable developer rolls 46 such as magnetic development rolls advance a developer material into contact with the electrostatic latent image. The latent image attracts toner particles from the carrier granules of the developer material to form a toner powder image upon the surface of charge receiver 42.

The point on charge receiver 42 is then advanced to a transfer means shown generally at 48 where a copy sheet is moved into contact with the powder image. The transfer means 48 includes a transfer corotron 50 for spraying ions onto the backside of the copy sheet and also includes a pretransfer baffle generally shown at 52. Copy sheets are fed from selected trays, for example, tray 54 and conveyed through a suitable copy sheet paper path, driven by suitable rolls such as rolls 56 and 58 to the transfer means.

After transfer, the copy sheet is driven to fuser means 60 including fusing rolls for permanently affixing the transferred powder image to the copy sheet. Preferably, the fuser means includes a heated fuser roll 61 and backup or pressure roll 62 with the sheet passing therebetween. After fusing, the copy sheet is transported to a suitable output tray such as illustrated at 64. In addition, a suitable cleaner 66, for example, a blade cleaner in contact with the receiver surface removes residual particles from the surface. Finally, an erase scorotron 68 neutralizes the charge on charge receiver 42 and recharges the receiver to the background voltage.

Figure 3:
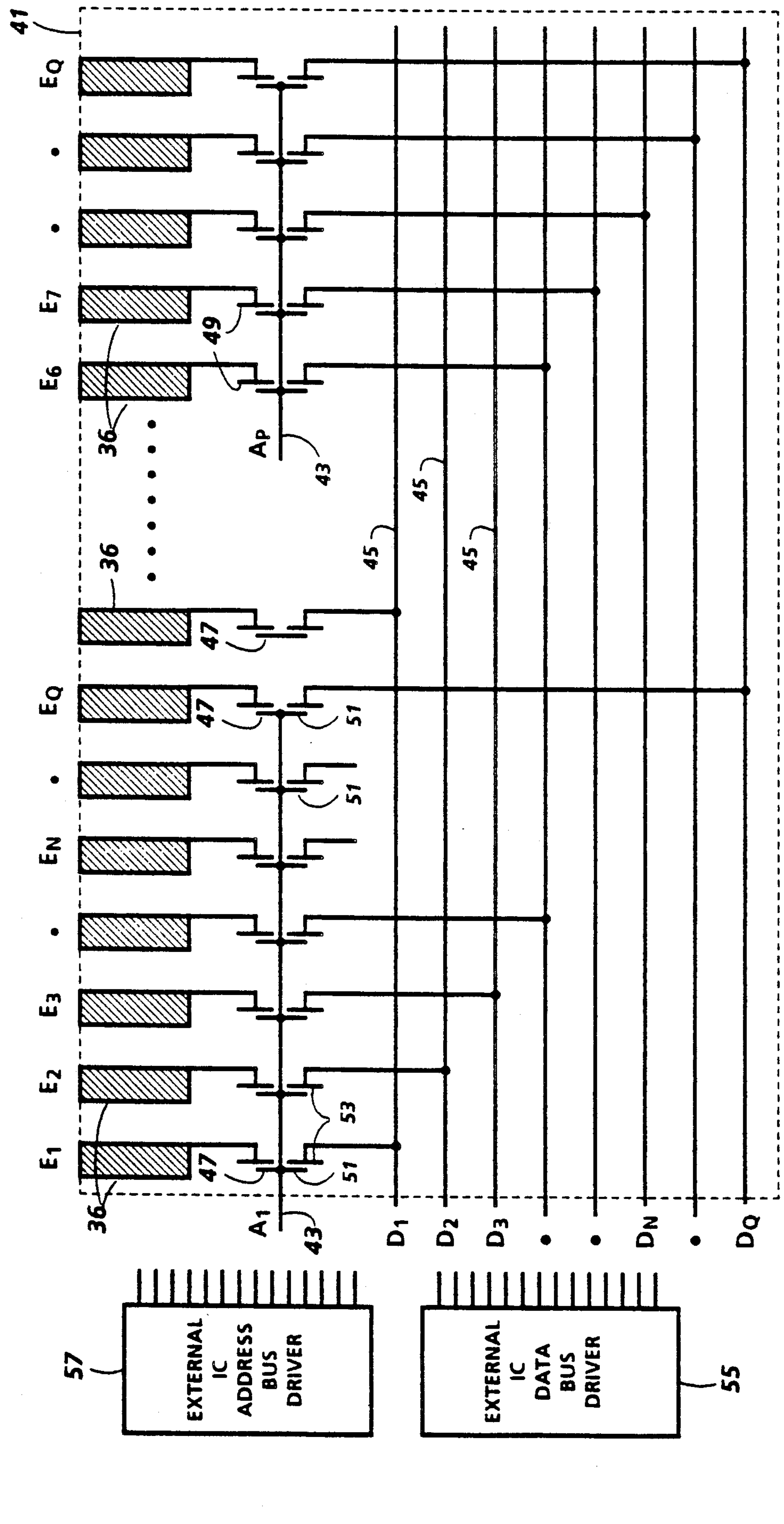
FIG. 3 is a schematic representation of the marking head of FIG. 1, showing the modulation electrodes, the switching elements and the driver circuitry.

Marking head 32 of FIG. 1, includes the elements schematically illustrated in FIG. 3 supported upon a planar substrate 41 (represented by the dotted outline). These elements include the array of modulation electrodes (E) 36 and a multiplexed data entry or loading circuit, comprising a small number of address bus lines (A) 43 and data bus lines (D) 45. Each of the modulation electrodes in the array is individually switchable while simultaneously reducing the number of wire bonds required to interface the electrodes with external driver circuits 55 and 57. Thin film switches 47 are fabricated directly on the marking head between the electrodes 36 and the data bus lines 45 and connected serially by small traces so that no wire bonds are required.

Referring now to FIGS. 4, 5 and 6, there is shown an enlarged fragmentary sectional view of a gap 37 in the ion projection device of FIG. 1, which is defined by charge receiver 42 and a printer head 5 (partially shown). Located within gap 37 are a number of particulates 35 such as paper fibers. A method of removing these contaminating particles from gap 37, according to one method of the present invention, is as follows. After the operator cycles up the ion printing device and activates the source of pressurized transport fluid (preferably air) via inlet channel 22 into chamber 12 to move ion-laden air through the outlet channel, the external driver circuits 55 and 57 then set the output pixel state of the modulation electrodes to white. As discussed above, this entails electrically connecting all of modulation electrodes 36 in the raster line to a voltage potential source which is substantially different relative to the voltage potential of the interior wall of outlet channel 26 opposite modulation electrodes 36 thereby inhibiting the entire flow of ions exiting printer head 5 at all points along the raster line. Next, the external driver circuits set the output pixel state of modulation electrodes 36 to black. Again, as discussed above, this includes electrically connecting all of modulation electrodes 36 in the raster line to a voltage potential source which is substantially the same relative to the voltage potential of the interior wall of outlet channel 26 opposite modulation electrodes 36 thereby enabling the flow of ions exiting printer head 5. The above setting steps are performed sequentially and alternately for a number of iterations and also while the ion printing device is not enabled for printing. Further, the air moving step is performed concurrently with the setting steps.

In FIG. 4, particulates 35 are shown located within gap 37 prior to performing the method of the present invention. FIG. 5 shows the reaction of particulates 35 to the varying field created during the steps of sequentially and alternately setting the output pixel state of the modulation electrodes to white, and setting the output pixel state of the modulation electrodes to black. Particulates 35 become dipoles due to the varying field and consequently affix themselves to either charge receiver 42 or modulation electrodes 36. The varying field imparts a mechanical motion upon particulates 35. This mechanical motion, along with the force exerted on particulates 35 by the flow of air through outlet channel 26, results in the removal of particulates 35 from gap 37. FIG. 6 shows gap 37 being free of particulates 35 after one iteration of the setting steps. In order to ensure that all contaminating particulates are removed from gap 37, a plurality of iterations of the setting steps may be performed. Once particulates 35 are removed from gap 37, a new digital image may be recorded on charge receiver 42 and thereafter developer means 44, transfer means 48 and fuser means 60 may be activated and utilized in carrying out the function of the printing apparatus as set forth above.

While the mechanical motion imparted to particulates 35 by the varying field is significant when the interior wall of outlet channel 26 opposite modulation electrodes 36 has a voltage potential of either approximately zero volts or twelve hundred volts, relatively more mechanical force is exerted upon particulates 35 when such wall has a voltage of approximately zero volts. This is true because the percent change in the field affecting particulates 35 is greater when such wall has a voltage of approximately zero volts.

In recapitulation, the method of removing particulates of the present invention requires that air is moved through the outlet channel of the printer head, the output pixel state of the modulation electrodes be set to white, and the output pixel state of the modulation electrodes be set to black. The above setting steps are performed sequentially and alternately for a number of iterations and the air moving step is performed concurrently with the setting steps. In addition, the method is performed while the ion printing device is not enabled for printing.

It is, therefore, apparent that there has been provided in accordance with the present invention, an ion printing device that fully satisfies the aims and advantages hereinbefore set forth. While this invention has been described in conjunction with a specific embodiment and method of use thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method of removing particulates from a gap in an ion projection device, when the device is not enabled for printing, with the gap being defined by a charge receiver and a printer head having a plurality of modulation electrodes, an inlet channel, an outlet channel, an ion generator, a source of fluid in communication with the inlet channel to move fluid through the outlet channel, comprising the steps of:

moving a fluid through the outlet channel;

setting an output pixel state of the modulation electrodes to white; and setting the output pixel state of the modulation electrodes to black, wherein said setting steps are performed sequentially and alternately for a number of iterations and said fluid moving step is performed concurrently with said setting steps.

2. The method of claim 1, wherein said fluid is comprised of air.

3. The method of claim 1, with the printer head having an outlet channel with the plurality of modulation electrodes positioned on one interior wall thereof, wherein:

said step of setting the output pixel state of the modulation electrodes to white comprises electrically connecting the plurality of modulation electrodes to a voltage potential source which is substantially different relative to a voltage potential of an interior wall of the outlet channel opposite the modulation electrodes thereby inhibiting a flow of ions exiting the printer head; and said step of setting the output pixel state of the modulation electrodes to black comprises electrically connecting the plurality of modulation electrodes to a voltage potential source which is substantially the same relative to the voltage potential of the interior wall of the outlet channel opposite the modulation electrodes thereby enabling the flow of ions exiting the printer head.

4. The method of claim 3, wherein:

said step of setting the output pixel state of the modulation electrodes to white comprises setting the voltage potential of the interior wall of the outlet channel opposite the modulation electrodes to approximately zero volts; and said step of setting the output pixel state of the modulation electrodes to black comprises setting the voltage potential of the interior wall of the outlet channel opposite the modulation electrodes to approximately zero volts.

5. The method of claim 1, with the ion projection device having a developer means for developing a latent image further comprising the step of activating the developer means after said setting steps are performed.

6. An ion printing device, comprising:

a charge receiver;

means, positioned substantially adjacent said charge receiver, for projecting a flow of ions thereon; and means for performing, when the device is not enabled for printing, at least one iteration of sequentially and alternately inhibiting said flow of ions from said ion projecting means, and enabling said flow of ions from said ion projecting means.

7. The ion printing device of claim 6, wherein said means for projecting a flow of ions comprises:

an outlet channel;

an inlet channel;

means for producing ions; and a fluid source, in communication with said inlet channel, to projections though said outlet channel and onto said charge receiver.

8. The ion printing device of claim 7, wherein said outlet channel comprises a first interior wall having a plurality of electrodes thereon.

9. The ion printing device of claim 8, wherein said outlet channel further comprises a second interior wall, opposed and spaced from said electrodes, having a voltage potential of approximately zero volts.

10. The ion printing device of claim 9, wherein said electrodes are electrically connected to a voltage potential source that is alterable between a voltage potential which is substantially different relative to the voltage potential of said second wall of said outlet channel, and a voltage potential which is substantially the same relative to the voltage potential of said second wall of said outlet channel.

11. The ion printing device of claim 7, wherein said fluid source is comprised of an air source.

* * * * *